United States Patent [19]

Bartch et al.

[11] Patent Number: 5,300,856
[45] Date of Patent: Apr. 5, 1994

[54] RESISTIVE, ADHESIVE-PRIMER COATING FOR A DISPLAY APPARATUS AND METHOD OF MAKING SAME

[75] Inventors: Donald W. Bartch, Wrightsville; James F. Edwards, Lancaster, both of Pa.

[73] Assignee: Thomson Consumer Electronics, Inc., Indianapolis, Ind.

[21] Appl. No.: 853,284

[22] Filed: Mar. 18, 1992

[51] Int. Cl.⁵ .............................................. H01J 29/00
[52] U.S. Cl. ................................... 313/479; 313/313; 220/2.1 R
[58] Field of Search ................. 313/479, 477 HC, 313; 220/2.1 R

[56] References Cited

U.S. PATENT DOCUMENTS

| | | | |
|---|---|---|---|
| 3,383,000 | 5/1968 | Powell et al. | 220/2.1 |
| 3,621,318 | 11/1971 | Lewinson | 313/64 |
| 3,746,904 | 7/1973 | Torre | 313/64 |
| 4,217,521 | 8/1980 | Dietch et al. | 313/479 |
| 4,564,786 | 1/1986 | Baum et al. | 313/479 |
| 4,988,915 | 1/1991 | Zegers | 313/479 |

FOREIGN PATENT DOCUMENTS

| | | | |
|---|---|---|---|
| 2806033 | 8/1979 | Fed. Rep. of Germany | 313/479 |
| 2816490 | 10/1979 | Fed. Rep. of Germany | 313/479 |

OTHER PUBLICATIONS

RCA Technical Note 1290, mailed Jan. 21, 1982.

*Primary Examiner*—Donald J. Yusko
*Assistant Examiner*—Nimesh Patel
*Attorney, Agent, or Firm*—Joseph S. Tripoli; Dennis H. Irlbeck; Vincent J. Coughlin, Jr.

[57] ABSTRACT

A display apparatus comprises a CRT having an evacuated envelope including a faceplate with a luminescent screen on the interior surface thereof. An electron gun is disposed within a neck of the envelope for generating and directing at least one electron beam toward the screen. A funnel connects the neck of the envelope with the faceplate. A deflection yoke is disposed around the envelope at the junction of the neck and the funnel. The yoke is attached to the envelope with an adhesive. The envelope further includes a first conductive coating on the interior surface of the funnel, a second conductive coating on at least a portion of the exterior surface of the envelope, and a third coating on the exterior surface of the envelope underlying the yoke and connected to the second conductive coating. The third coating provides a resistive, adhesive-primer coating that acts as a barrier between the yoke adhesive and the envelope and has a composition consisting essentially of a polychloroprene latex, a conductive filler material selected from the group consisting of carbon black and graphite, and water.

6 Claims, 2 Drawing Sheets

RESISTIVE, ADHESIVE-PRIMER COATING FOR A DISPLAY APPARATUS AND METHOD OF MAKING SAME

The present invention relates to a display apparatus, such as a cathode-ray tube (CRT) with a deflection yoke attached thereto, and, more particularly, to a resistive, adhesive-primer coating which forms a barrier disposed between the tube and the yoke.

BACKGROUND OF THE INVENTION

The display apparatus, such as a television picture tube or a display tube, comprises an evacuated envelope which includes a faceplate and a rectangular funnel. A tri-color luminescent screen is disposed on the interior surface of the faceplate. An electron gun for generating and directing at least one, and preferably three electron beams toward the screen is disposed within and closes the neck of the funnel. The panel, bearing the screen, is sealed to and closes the opposite end of the funnel. The interior surface of the funnel is coated with a first conductive layer and the exterior surface is partly covered with a second conductive layer. The conductive layer on the interior surface of the funnel forms the connection between the last electrode of the electron gun and the screen on which the electron beams impinge. The conductive layer on the interior surface of the funnel thus acts as a second anode and also creates a field-free space in the region of the tube in which the electron beams are not deflected. The conductive layer on the exterior of the funnel is grounded and, together with the interior conductive layer, forms a capacitor which serves to smooth the applied high voltage. The apparatus further includes a system of deflection coils, called a deflection yoke, disposed around the neck-funnel transition region of the envelope.

It is known in the art to provide a high resistance coating or layer on the exterior portion of the tube envelope underneath the deflection yoke, in order to reduce interference generated by the deflection system. Typically, the high resistance layer has a resistance of between $10^6$ and $10^{10}$ ohms per square. The high resistance layer is electrically connected to the second conductive layer disposed on the exterior surface of the funnel. Apparatuses made with a low resistance layer, or having no coating at all underneath the yoke, develop an inductive charge which "flashes-over", or electrically discharges, to the deflection yoke or to the second conductive layer on the exterior surface of the funnel. The discharge is accompanied with an annoying crackling or sputtering sound.

The problem is exacerbated in the current generation of high resolution display apparatuses in which the horizontal scan rate is twice that of prior tubes, thus requiring the deflection yoke to operate at a higher current, thereby generating additional heat underneath the yoke and increasing the magnitude of the induced charge. The high resistance coating underneath the deflection yoke also must be compatible with other steps in the manufacturing process, such as alignment and attachment of the deflection yoke. In the present manufacturing process, the yoke, after alignment, is rapidly secured by an adhesive to the tube. Conventional high resistance coatings, such as those known in the art and containing polyvinyl acetate and suitable quantities of metal oxides and soots, or water-based urethane resins and conductive materials, are unsatisfactory, because they are either incompatible with, or slow, the curing process of the adhesive. Thus, a need exists for a high resistance coating which is compatible with the above-described yoke attachment process, and which provides the protection needed to reduce electrical interference from the yoke and to prevent the build-up and flash-over of induced charge.

SUMMARY OF THE INVENTION

A display apparatus comprises a CRT having an evacuated envelope with an interior surface and an exterior surface. The envelope includes a faceplate having a luminescent screen on the interior surface thereof. An electron gun is disposed within a neck of the envelope for generating and directing at least one electron beam toward the screen. A funnel connects the neck of the envelope with the faceplate. A deflection yoke is disposed around the envelope at the junction of the neck and the funnel. The yoke is attached to the envelope with an adhesive.

The envelope further includes a first conductive coating on the interior surface of the funnel, a second conductive coating on at least a portion of the exterior surface of the envelope, and a third coating on the exterior surface of the envelope underlying the yoke and connected to the second conductive coating. The third coating provides a resistive, adhesive-primer coating which forms a barrier between the yoke adhesive and the envelope. The third coating has a composition consisting essentially of a polychloroprene latex, a conductive filler material selected from the group consisting of carbon black and graphite, and water. A method of making the resistive, adhesive-primer coating.

DETAILED DESCRIPTION OF THE PREFERRED EMBODIMENT

Figure 1:
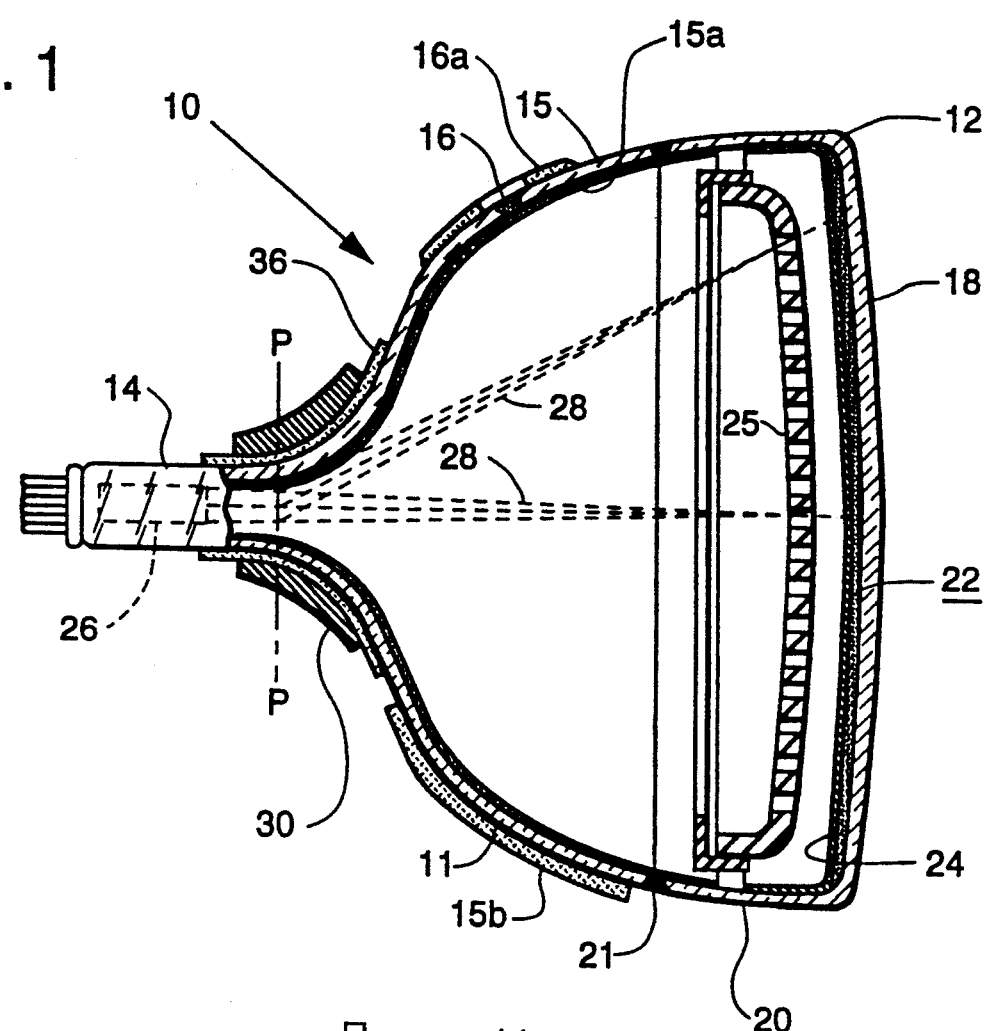
FIG. 1 is a plan view, partially in axial section, of a color display apparatus utilizing the present invention.
Figure 2:
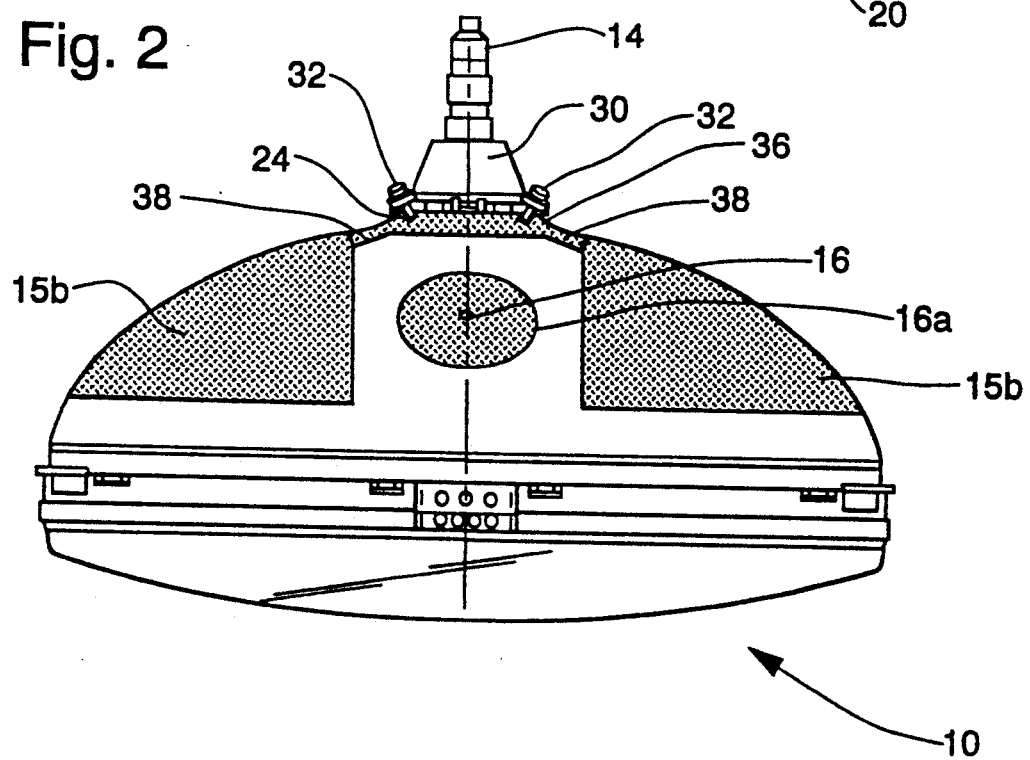
FIG. 2 is a top view of the apparatus shown in FIG. 1.
Figure 3:
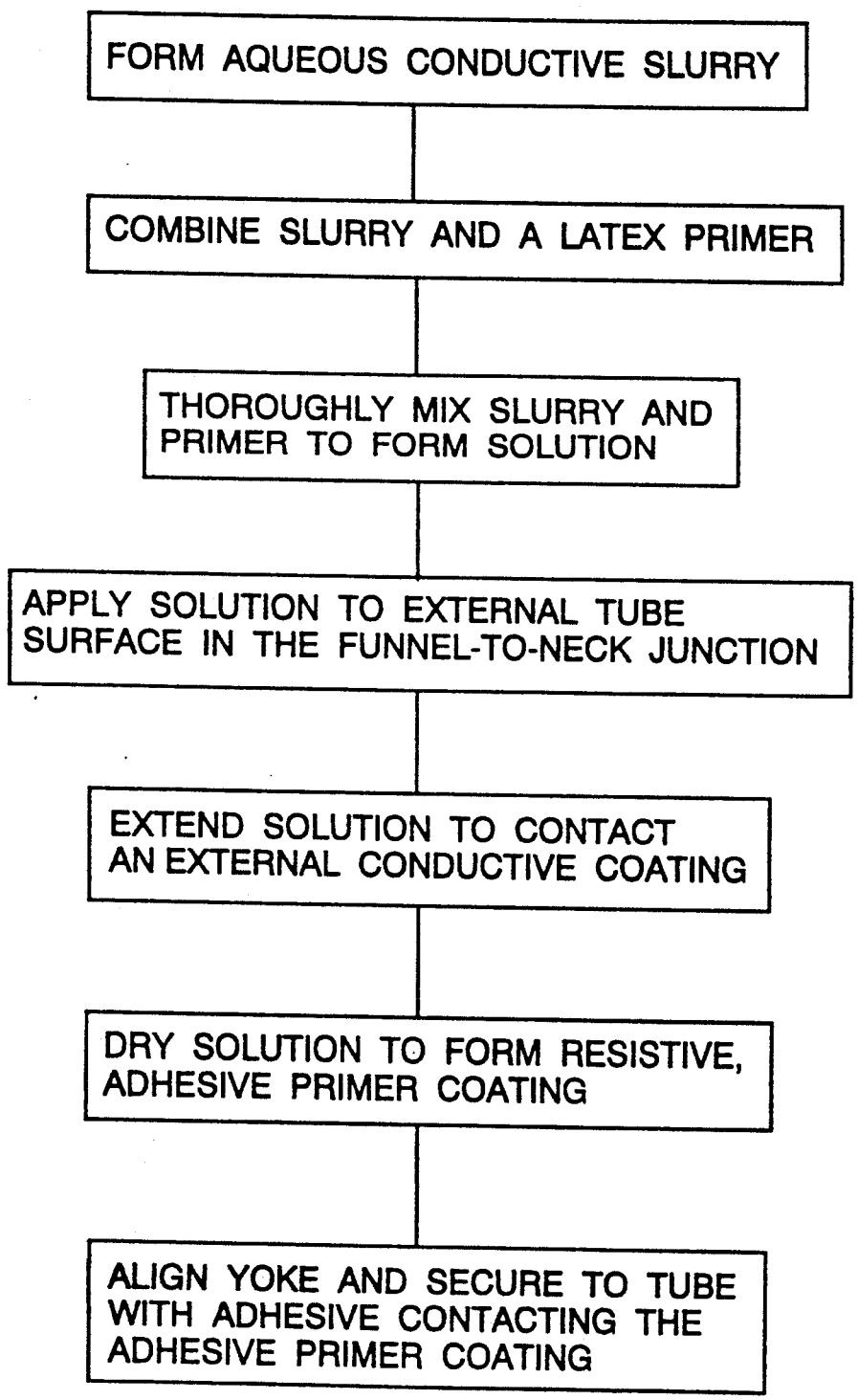
FIG. 3 is a block diagram of a manufacturing process for forming a resistive, adhesive-primer coating and attaching a yoke thereto.

FIGS. 1 and 2 show a color display apparatus including a CRT 10, having a glass envelope 11 comprising a substantially rectangular faceplate panel 12 and a tubular neck 14 connected by a rectangular funnel 15. The funnel 15 has an interior conductive coating 15a that contacts an anode button 16 and extends into the neck 14. An exterior conductive coating 15b overlies at least a portion of the interior coating 15a. An external insulative coating 16a surrounds the outer portion of the anode button 16. The panel 12 comprises a viewing faceplate 18 and a peripheral flange or sidewall 20 which is sealed to the funnel 15 by a glass frit 21.

A three color phosphor screen 22 is carried on the inner surface of the faceplate 18. The screen 22 preferably is a line screen which includes a multiplicity of screen elements comprised of red-emitting, green-emitting and blue-emitting phosphor stripes R, G and B, respectively, arranged in color groups or picture elements of three stripes or triads in a cyclic order (not shown) and extending in a direction which is generally normal to the plane in which the electron beams are generated. In the normal viewing position of the embodiment, the phosphor stripes extend in the vertical direction. Preferably, the phosphor stripes are separated from each other by a light-absorbing matrix material (also not shown), as is known in the art. Alternatively the screen can be a dot screen. A thin conductive layer 24, preferably of aluminum, overlies the screen 22 and provides a means for applying a uniform potential to the screen as well as for reflecting light, emitted from the phosphor elements, through the faceplate 18. The screen 22 and the overlying aluminum layer 24 comprise a screen assembly.

A multi-apertured color selection electrode or shadow mask 25 is removably mounted in predetermined spaced relation to the screen assembly, by conventional means. An electron gun 26, shown schematically by the dashed lines in FIG. 1, is centrally mounted within the neck 14, to generate and direct three electron beams 28 along convergent paths, through the apertures (not shown) in the mask 25, to the screen 22. The gun 26 may be any type of CRT electron gun known in the art.

The tube 10 is designed to be used with an external magnetic deflection yoke 30, located in the region of the funnel-to-neck junction. When activated, the yoke 30 subjects the three beams 28 to magnetic fields which cause the beams to scan horizontally and vertically in a rectangular raster over the screen 22. The initial plane of deflection (at zero deflection) is shown by the line P-P in FIG. 1, at about the middle of the yoke 30. For simplicity, the actual curvatures of the deflection beam paths in the deflection zone are not shown. The yoke 30 is attached to the neck 14 by a clamp (not shown) and contacts the envelope in the funnel-to-neck junction by means of a plurality of adjustment screws 32, shown in FIG. 2. The ends of the screws in contact with the envelope are cemented thereto by an adhesive 34. As so far described, the display apparatus is conventional.

A novel high resistance coating 36 having a resistance within the range of about $10^6$ to $10^{10}$ ohms/square, and preferably about $10^7$ to $5 \times 10^7$ ohms/square, is provided on the exterior surface of the funnel 15, underlying the yoke 30, and extending along the neck of the tube to be coextensive with the internal coating 15a. As shown in FIG. 2, the high resistance coating 36 extends forward of the yoke attachment screws 32 and has a pair of oppositely disposed projections 38 (at the 3 and 9 o'clock positions) which contact the conductive coating 15b. The novel high resistance coating 36 is a water-based, latex material that provides an adhesive-primer which acts as a barrier between the yoke adhesive and the glass envelope to facilitate accurate attachment of the yoke, after yoke alignment. The primer is compatible with both urethane and hot-melt adhesives which are used to cement the contacting portions of the yoke screws 32 to the envelope and thus permits rapid and accurate yoke attachment which speeds the manufacturing process.

The novel high resistance coating comprises, in weight percent:

| | |
|---|---|
| polychloroprene latex (44 wt.% solids) | 88 ± 2%, |
| a conductive filler material selected from the group consisting of carbon black and graphite, | 2.5 ± 0.5%, |
| a dispersant sold under the trademark MARASPERSE and the balance being water | 0.3 ± 0.1% |

The novel high resistance, adhesive-primer coating is made as follows:
a) pour 750 g. of hot deionized water (65°-51° C.) into a stainless steel beaker;
b) slowly add 30 g. the dispersant, sold under the trademark MARASPERSE available from Reed Lignin Co., Rothchild, Wis., to the hot water and stir continuously to form a solution;
c) gradually stir into the solution 213 g. of carbon black to form a conductive slurry;
d) mix the slurry in a blender at a high speed for two minutes, and then transfer the slurry to a a 1 liter plastic bottle;
e) pour 750 g. of polychloroprene latex adhesive primer, manufactured by National Starch and Chemical Co., Bridgewater, N.J., into an empty 1 liter plastic bottle, and add 102 g. of the slurry, to form a high resistance adhesive-primer solution;
f) roll the plastic bottle containing the coating materials on a ball mill for a minimum of 24 hours; and
g) test the solution for linear resistance by applying a quantity of the solution to a clean glass plate using a flat paint brush with a 50 mm width. Allow the solution to air dry and form a coating. Measure the linear resistance of the coating with an ohm meter. The resistance must be in the range of $10^6$–$10^9$ ohms/square (a 25.4 mm square pad is used for the resistance check). Additional primer may be added to the solution to increase the resistance and additional carbon black may be added to decrease it.

When the high resistance adhesive-primer is applied to the tube 10, using a brush or other suitable applicator, it must be allowed to air dry for at least 15 minutes to form the coating 36 before the yoke 30 is attached to the tube. The drying time can be shortened by preheating the tube or drying the primer with heated air. It has been determined that the resistance can be increased by an order of magnitude (10×) by drying the coating 36 with heated air. The primer is applied to the exterior surface of the envelope, in the region of the funnel-to-neck junction. The coating 36 extends along the neck 14 for a distance that is coextensive with the interior conductive coating 15a. The coating 36 extends forward of the yoke 30 so that the yoke attachment screws 32 contact the coating 36. The screws are secured to the coating 36 with a hot-melt adhesive, sold under the trademark MACROMELT #6238, available from Henkel Adhesives, Co., La Grange, Ill. Electrical connection to the grounded conductive coating 15b is provided by the projections 38.

A test was initially conducted using one hundred and twenty-five (125) 35 V110-degree tubes with conventional yokes and with the novel coating 36. Electrical tests of operating television sets with these apparatuses showed a slight reduction in discharge-induced set shutdowns. An additional 200-tube test, using 31 V and 35 V110-degree tubes, was conducted with 2 H yokes mounted on the tubes. The 2 H yoke, which has a horizontal scan rate double that of the conventional yoke, generates more heat than a conventional yoke and causes an increase in the inductive charge buildup. The novel high resistance adhesive-primer coating 36 was effective in preventing the flashover or discharge of this induced charge by permitting the charge to bleed-off to the grounded conductive coating 15b. Additionally, the novel coating 36 proved to be compatible with the hot melt adhesive used to attach the yoke adjustment screws 32 to the coated envelope of very large size tubes having a diagonal screen dimension of 79 cm, or larger. While carbon black is the conductive additive of choice in the novel coating 36, graphite in the same proportion, also can be used, with only a slight decrease in the strength of the attachment of the hot melt adhesive to the coating.

What is claimed is:

1. A display apparatus comprising a CRT having an evacuated envelope with an interior surface and an exterior surface, said envelope including a faceplate having a luminescent screen on the interior surface thereof, a neck with an electron gun therein for generating and directing at least one electron beam toward said screen, a funnel connecting said neck and said faceplate and a deflection yoke disposed around said envelope at the junction of said neck and said funnel and attached thereto with an adhesive, said envelope further including a first conductive coating on the interior surface of said funnel, a second conductive coating on at least a portion of the exterior surface of said funnel, and a third coating on the exterior surface of said funnel underlying said yoke and connected to said second conductive coating, said third coating being a resistive, adhesive primer coating forming a barrier between said yoke adhesive and said envelope, said resistive, adhesive-primer coating consisting essentially of a polychloroprene latex, a conductive filler material selected from the group consisting of carbon black and graphite, and water.

2. The display apparatus as described in claim 1, wherein the concentration of said latex and said conductive filler material providing a linear resistance within the range of $10^6$ to $10^{10}$ ohms per square for said resistive, adhesive primer coating.

3. The apparatus as described in claim 1, wherein said resistive, adhesive primer coating has a linear resistance within the range of about $10^7$ to $5 \times 10^7$ ohms per square.

4. The apparatus as described in claim 1, wherein said resistive, adhesive primer coating further includes a dispersant.

5. A display apparatus comprising a CRT having an evacuated envelope with an interior surface and an exterior surface, said envelope including a faceplate having a luminescent screen on the interior surface thereof, a neck with an electron gun therein for generating and directing at least one electron beam toward said screen, a funnel connecting said neck and said faceplate, and a deflection yoke disposed around said envelope at the junction of said neck and funnel and attached thereto with an adhesive, said envelope further including a first conductive coating on the interior surface of said funnel, a second conductive coating on at least a portion of the exterior surface of said funnel, and a third coating on the exterior surface of said funnel underlying said yoke and connected to said second conductive coating, said third coating being a resistive, adhesive primer coating forming a barrier between said yoke adhesive and said envelope, said resistive adhesive-primer coating consisting essentially, in weight percent, of:

| polychloroprene latex | $88 \pm 2\%$, |
| a conductive filler material selected from the group consisting of carbon black and graphite and the balance being water. | $2.5 \pm 0.5\%$ |

6. The apparatus as described in claim 5, further including about $0.3 \pm 0.1$ wt. % of a dispersant.

* * * * *